United States Patent [19]
Jäger

[11] Patent Number: 5,241,057
[45] Date of Patent: Aug. 31, 1993

[54] AMINO DISAZO DYESTUFFS CONTAINING A FLUOROPYRIMIDINYL OR A FLUOROTRIAZINYL REACTIVE GROUP

[75] Inventor: Horst Jäger, Leverkusen, Fed. Rep. of Germany

[73] Assignee: Bayer Atkiengesellshaft, Leverkusen, Fed. Rep. of Germany

[21] Appl. No.: 787,700

[22] Filed: Nov. 1, 1991

[63] Continuation-in-part of Ser. No. 118,598, Nov. 9, 1987, abandoned, which is a continuation-in-part of Ser. No. 706,572, Feb. 28, 1985, abandoned, which is a continuation-in-part of Ser. No. 453,397, Dec. 27, 1982, abandoned.

[30] Foreign Application Priority Data

Jan. 15, 1982 [DE] Fed. Rep. of Germany ....... 3201114

[51] Int. Cl.$^5$ .................. C09B 62/03; C09B 62/513; D06P 1/382
[52] U.S. Cl. ................................. 534/637; 534/632
[58] Field of Search ........................................ 534/637

[56] References Cited

U.S. PATENT DOCUMENTS

| | | | |
|---|---|---|---|
| 4,412,948 | 11/1983 | Omura et al. | 534/637 |
| 4,839,469 | 6/1989 | Jager | 534/637 |
| 4,996,304 | 2/1991 | Tzikas | 534/642 X |

FOREIGN PATENT DOCUMENTS

| | | | |
|---|---|---|---|
| 0040790 | 12/1981 | European Pat. Off. | 534/637 |
| 0040806 | 12/1981 | European Pat. Off. | 534/637 |
| 3113473 | 7/1981 | Fed. Rep. of Germany | 534/637 |
| 2076006 | 11/1981 | United Kingdom | 534/637 |

*Primary Examiner*—Mary O. Lee
*Assistant Examiner*—Fiona T. Powers
*Attorney, Agent, or Firm*—Sprung Horn Kramer & Woods

[57] ABSTRACT

Dyestuffs of the formula

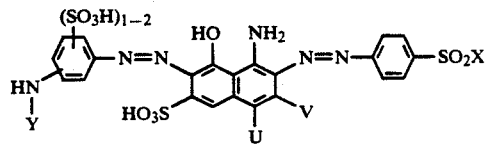

wherein
  $X = -CH=CH_2$, $-CH_2-CH_2OSO_3H$, $-CH=CHCl$ or $-CH_2-CH_2Cl$ and
  Y = a fiber-reactive fluoropyrimidinyl or fluorotriazine radical and
wherein
  u and v = H or $SO_3H$, where $u \approx v$. Such dyestuffs suitable for dyeing and printing diverse substrates, particularly cotton, to give products a high degree of dyestuff fixation.

7 Claims, No Drawings

AMINO DISAZO DYESTUFFS CONTAINING A FLUOROPYRIMIDINYL OR A FLUOROTRIAZINYL REACTIVE GROUP

This application is a continuation of application Ser. No. 118,598, filed Nov. 9, 1987, now abandoned, which is a continuation of application Ser. No. 06/706,572, filed Feb. 28, 1985, now abandoned, which in turn is a continuation of application Ser. No. 06/453,397, filed Dec. 27, 1982, now abandoned.

The present invention relates to new disazo reactive dyestuffs which, in the form of the free acid, correspond to the formula (1):

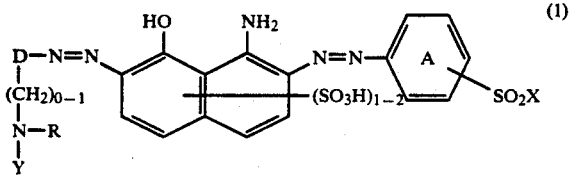

wherein
R=H or $C_1$–$C_4$-alkyl,
D=the radical of a diazo component of the benzene or naphthalene series,
X=—CH=CH$_2$—, —CH$_2$CH$_2$OSO$_3$H, —CH=CHCl or —CH$_2$—CH$_2$Cl, and
Y=the radical of a fibre-reactive fluoroheterocyclic structure which is optionally substituted by further radicals, and
wherein
the benzene radical A can be further substituted by CH$_3$, C$_2$H$_5$, OCH$_3$ or OC$_2$H$_5$ Suitable $C_1$–$C_4$-alkyl radicals for R are: methyl, ethyl, propyl, isopropyl, butyl, isobutyl, sec.-butyl and tert.-butyl.

The radical D can contain the substituents customary in the case of azo dyestuffs. The following may be mentioned as examples of substituents in this connection:

Alkyl groups having 1 to 4 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino, propionylamino and benzoylamino, carbamoyl, sulphamoyl, the ureido group, the hydroxyl group and the carboxyl group, halogen, such as fluorine, chlorine and bromine and the sulphonic acid group.

Suitable radicals Y are in particular those of 5-membered or 6-membered heterocyclic structures having one or more nitrogen atoms and optionally having 5-membered or 6-membered carbocyclic rings fused on, and at least one fluorine atom which can be split off under conditions of dyeing.

The following heterocyclic systems may be mentioned as examples:

Pyridine radicals, pyrimidine radicals, triazine radicals, quinoline radicals and phenanthridine radicals.

Suitable radicals of this type are described, for example, in the British Patent Specifications 1,526,840, 1,169,254 and 1,188,606.

The following radicals Y may be mentioned individually:

2-Amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxy-ethylamino-4-fluorotriazin-6-yl, 2-β-hydroxyethylamino-4-fluorotriazin-6-yl, 2-di-(β-hydroxyethylamino)-4-fluorotriazin-6-yl, 2-β-sulphoethylamino-4-fluorotriazin-6-yl, 2-β-sulphoethyl-methylamino-4-fluorotriazin-6-yl, 2-β-carboxymethylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-(x-sulphobenzyl)-amino-4-fluorotriazin-6-yl, 2-cyclohexylamino-4-fluorotriazin-6-yl, 2-(o-, m-, p-sulphophenyl)-amino-4-fluorotriazin-6-yl, 2-(2′,5′-disulphophenyl)-amino-4-fluorotriazin-6-yl, 2-(o-, m-, p-chlorophenyl)-amino-4-fluorotriazin-6-yl, 2-(o-, m-, p-methoxyphenyl)-4-fluorotriazin-6-yl, 2-(2′-methyl-4′-sulphophenyl)-amino-4-fluorotriazin-6-yl, 2-(2′-methyl-5′-sulphophenyl)-amino-4-fluorotriazin-6-yl, 2-(2′-chloro-4′-sulphophenyl)-amino-4-fluorotriazin-6-yl, 2-(2′-chloro-5′-sulphophenyl)-amino-4-fluorotriazin-6-yl, 2-(2′-methoxy-4′-sulphophenyl)-amino-4-fluorotriazin-6-yl, 2-(o-, m-, p-carboxyphenyl)-amino-4-fluorotriazin-6-yl, 2-(2′,4′-disulphophenyl)-amino-4-fluorotriazin-6-yl, 2-(3′,5′-disulphophenyl)-amino-4-fluorotriazin-6-yl, 2-(2′-carboxy-4-sulphophenyl)-amino-4-fluorotriazin-6-yl, 2-(6′-sulphonaphth-2′-yl)-amino-4-fluorotriazin-6-yl, 2-(4′,8′-disulphonaphth-2′-yl)-amino-4-fluorotriazin-6-yl, 2-(6′,8′-disulphonaphth-2′-yl)-amino-4-fluorotriazin-6-yl, 2-(N-methylphenyl)amino-4-fluorotriazin-6-yl, 2-(N-ethylphenyl)-amino-4-fluorotriazin-6-yl, 2-(N- -hydroxyethylphenyl)-amino-4-fluorotriazin-6-yl, 2-(N-iso-propylphenyl)-amino-4-fluorotriazin-6-yl, 2-morpholino-4-fluorotriazin-6-yl, 2-piperidino-4-fluorotriazin-6-yl, 2-(4′,6′,8′-trisulphonaphth-2′-yl)-fluorotriazin-6-yl, 2-(3′,6′,8′-trisulphonaphth-2′-yl)-4-fluorotriazin-6-yl, 2-(3′,6′-disulphonaphth-1′-yl-4-fluorotriazin-6-yl, 2,6-difluoropyrimidin-4-yl, 2,6-difluoro-5-chloropyrimidin-4-yl, 2-fluoro-5,6-dichloropyrimidin-4-yl, 2,6-difluoro-5-methylpyrimidin-4-yl, 2,5-difluoro-6-methylpyrimidin-4-yl, 2-fluoro-5-methyl-6-chloropyrimidin-4-yl, 5-bromo-2-fluoropyrimidin-4-yl, 2-fluoro-5-cyanopyrimidin-4-yl, 2-fluoro-5-methylpyrimidin-4-yl, 2,5,6-trifluoropyrimidin-4-yl, 5-chloro-6-chloromethyl-2-fluoropyrimidin-4-yl, 2,6-difluoro-5-bromopyrimidin-4-yl, 2-fluoro-5-bromo-6-methylpyrimidin-4-yl, 2-fluoro-5-bromo-6-chloromethylpyrimidin-4-yl, 2,6-difluoro-5-chloromethylpyrimidin-4-yl, 2,6-difluoro-5-nitropyrimidin-4-yl, 2-fluoro-6-methylpyrimidin-4-yl, 2-fluoro-5-chloro-6-methylpyrimidin-4-yl, 2-fluoro-5-chloropyrimidin-4-yl, 2-fluoro-6-chloropyrimidin-4-yl, 6-trifluoromethyl-5-chloro-2-fluoropyrimidin-4-yl, 6-trifluoromethyl-2-fluoropyrimidin-4-yl, 2-fluoro-5-nitropyrimidin-4-yl, 2-fluoro-5-trifluoromethylpyrimidin-4-yl, 2-fluoro-5-phenyl- or -5-methyl-sulphonylpyrimidin-4-yl, 2-fluoro-4-carboxamidopyrimidin-4-yl, 2-fluoro-5-carbomethoxypyrimidin-4-yl, 2-fluoro-5-bromo-6-trifluoromethylpyrimidin-4-yl, 2-fluoro-6-carboxamidopyrimidin-4-yl, 2-fluoro-6-carbomethoxypyrimidin-4-yl, 2-fluoro-6-cyanopyrimidin-4-yl, 2,6-difluoro-5-methylsulphonylpyrimidin-4-yl, 2-fluoro-5-sulphonamidopyrimidin-4-yl, 2-fluoro-5-chloro-6-carbomethoxypyrimidin-4-yl and 2,6-difluoro-5-trifluoromethylpyrimidin-4-yl.

Preferred reactive dyestuffs are those of the formulae of (2) to (6):

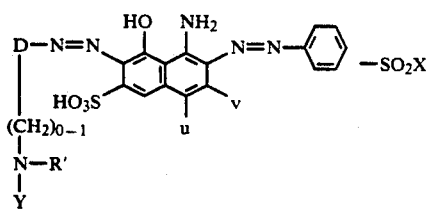 (2)

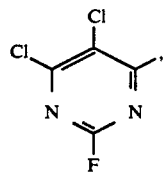 (7)

wherein

D, X and Y have the meaning given under formula (1), and u and v=H or $SO_3H$, where u≠v, and wherein R'=H or $CH_3$;

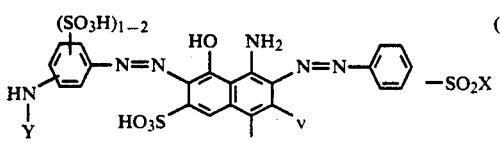 (3)

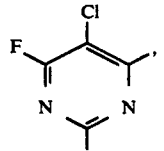 (8)

wherein

X, Y, u and v have the meaning given above;

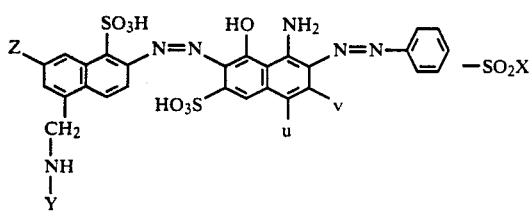 (4)

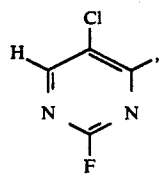 (9)

wherein

Y, X, u and v have the meaning given above, and Z=H or $SO_3H$;

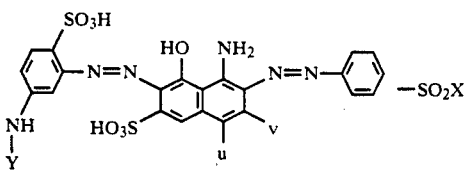 (5)

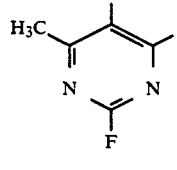 (10)

and

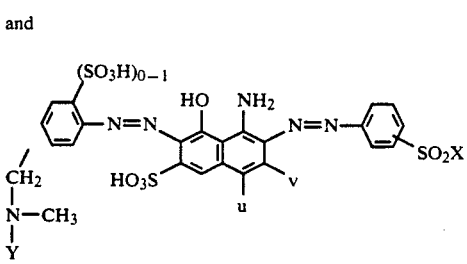 (6)

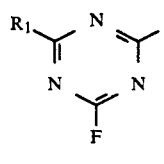 (11)

Examples of suitable substituents $R_1$ are amino groups, such as

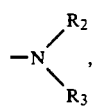

—$OR_4$ or —$SR_4$, wherein $R_2$ and $R_3$ independently of one another denote hydrogen, amino, $C_1$-$C_4$-alkyl, aryl, aralkyl or cycloalkyl, or together, if necessary with the inclusion of one or more hetero atoms, in particular oxygen and/or nitrogen, form a ring (in particular a 5-membered or 6-membered ring), and $R_4$ represents hydrogen, $C_1$-$C_4$alkyl, aryl or aralkyl.

The alkyl, aryl or aralkyl radicals $R_2$, $R_3$ and $R_4$ can have substituents which are customary in dyestuff chemistry, such as, for example, $SO_3H$, OH, $NH_2$, alkoxy ($C_1$-$C_4$), COOH, halogen or CN (in particular Cl).

The alkyl radicals $R_2$, $R_3$ and $R_4$ preferably have 1 to 4 carbon atoms. The aryl radicals $R_2$-$R_3$ and $R_4$ preferably represent phenyl or naphthyl, and aralkyl radicals $R_2$, $R_3$ and $R_4$ preferably represent alkyl($C_1$-$C_4$) which is substituted by phenyl or naphthyl.

wherein

Y, u, v and X have the meaning given above.

Further preferred reactive dyestuffs of the formulae 2 to 6 are those in which the grouping $SO_2X$ is in the p-position to the azo bridge, and in which X=$CH_2CH_2OSO_3H$, and furthermore those in which Y=

The invention furthermore relates to a process for the preparation of dyestuffs of the formula (1).

The compounds of the formula (1) are prepared, for example, as follows.

1) An amine of the formula

 (12)

is diazotised, the product is coupled, in acidic medium, to an 8-amino-1hydroxynaphthalenesulphonic acid of the formula

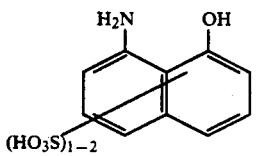 (13)

to give a compound of the formula

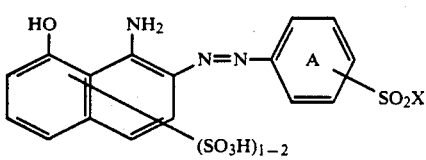 (14)

and this azo compound is coupled, in a neutral to alkaline medium, to the diazonium compound

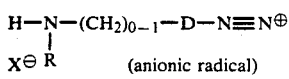

(anionic radical)

prepared from the diamine of the formula

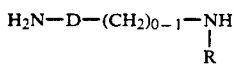 (15)

to give the disazo compound of the formula

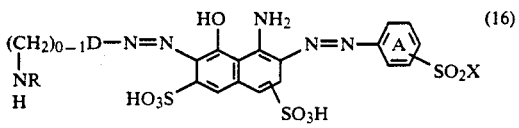 (16)

and this is condensed with a heterocyclic compound of the formula

F—Y (17)

(F=fluorine)

which is substituted by at least two fluorine atoms and optionally by further radicals, hydrofluoric acid being split off.

In some cases it is advantageous to use, for the coupling in a neutral to alkaline medium, in which a diamine is used as the diazo component of the formula

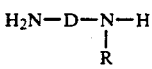 (18)

not this compound itself, but instead an aminoacylaminobenzenesulphonic acid, for example 5-acetylamino-anilinesulphonic acid, from which the acetyl group is split off by hydrolysis after coupling is complete, before condensation is carried out further. Furthermore, a nitro-amino compound, for example 5-nitro-aniline-2-sulphonic acid, can be used as the diazo component of the formula (18), and the nitro group can be reduced to the amino group after coupling to sodium sulphide or sodium hydrosulphide.

2) A diamine of the formula (15) is condensed with a heterocyclic compound of the formula (17), which is substituted by at least two fluorine atoms and if appropriate by further radicals, to give an amine of the formula

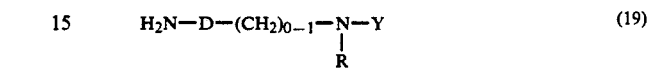 (19)

this amine is diazotised, and the product is coupled, in a neutral to alkaline medium, to a coupling component of the formula (14) to give a dyestuff of the formula (1).

In the case in which

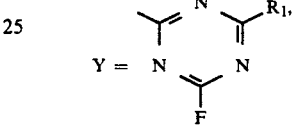

there is an additional variant for the possible preparations 1 and 2, which is characterised in that in the case of 1: the bisazo compound (16) and in the case of 2: the diamino compound (15) is first condensed with 2,4,6-trifluorotriazine of the formula

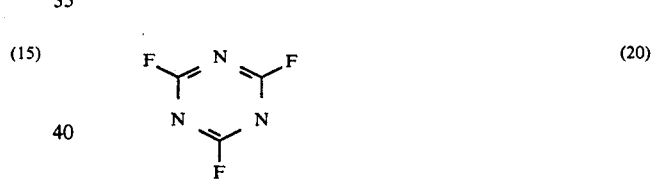 (20)

and the resulting primary condensation product is condensed with a compound of the formula

H—R$_1$ (21)

hydrofluoric acid being split off.

The preparation of the dyestuffs and dyestuff intermediate products according to the invention is preferably effected in an aqueous medium.

The reaction with fluorine-containing heterocyclic compounds is carried out at a slightly acidic to slightly alkaline pH value. The hydrofluoric acid liberated in the condensation is neutralised by the addition of dilute alkali metal hydroxide, carbonate or bicarbonate solution.

The following may be mentioned as examples of starting compounds for the preparation of the reactive dyestuffs of the formula (1):

a) Coupling Components of the Formula (13)

1-Amino-8-hydroxynaphthalene-3,6-disulphonic acid (H acid), 1-amino-8-hydroxynaphthalene-4,6-disulphonic acid (K acid) and 1-amino-8-hydroxynaphthalene-4-sulphonic acid.

b) Diazo Components of the Formula (12)

4-vinylsulphonylaniline, 3-vinylsulphonylaniline, 2,5-dichloro-4-vinylsulphonylaniline, 2-methoxy-5-vinylsulphonylaniline, sulphuric acid half ester of 4-β-hydroxyethylsulphonylaniline, of 3-β-hydroxyethylsulphonylaniline, and of 2-methoxy-5-β-hydroxyethylsulphonylaniline, 4-β-chloroethylsulphonylaniline and 4-β-chlorovinylsulphonylaniline.

c) Diazo Components of the Formula (15)

1,3- and 1,4-diaminobenzene, 1,3- and 1,4-diaminoanisole, 1,3- and 1,4-diaminotoluene, 1,3-diamino-4-chlorobenzene, 1,3-diamino-4-ethylbenzene, 1,3-diamino-4-ethoxybenzene, 1,3-diaminobenzene-4-sulphonic acid, 1,4-diaminobenzene-2-sulphonic acid, 1,4-diaminobenzene-2,5-disulphonic acid, 1,4-diaminobenzene-2,6-disulphonic acid, 1,3-diaminobenzene-4,6-disulphonic acid.

2-Amino-5-aminomethylnaphthalene-1-sulphonic acid, 2-amino-5-aminomethylnaphthalene-1,7-disulphonic acid, 1-amino-5-N-methylaminomethylbenzene-2-sulphonic acid, 1-amino-3-aminomethyl-4-methoxybenzene-2-sulphonic acid, 1-amino-3-N-methylaminomethylbenzene and 1-amino-4-N-methylaminomethylbenzene.

d) Fluoro-Heterocyclic Compounds of the Formula (17)

2,4-Difluoro-6-(o-, m-, p-methyl-phenyl)-amino-triazine, 2,4-difluoro-6-(o-, m-, p-sulphophenyl)-amino-triazine, 2,4-difluoro-6-methoxy-triazine, 2,4-difluoro-6-(2',5'- disulphophenyl)-amino-triazine, 2,4-difluoro-6-(6'-sulphonaphth-2'-yl)-amino-triazine, 2,4-difluoro-6-(o-, m-, p-ethylphenyl)-amino-triazine, 2,4-difluoro-6-(o-, m-, p- chlorophenyl)-amino-triazine, 2,4-difluoro-6-(o-, m-, p- methoxyphenyl)-amino-triazine, 2,4-difluoro-6-(2'-methyl-5'-sulphophenyl)-amino-triazine, 2,4-difluoro-6-(2'-methyl-4'-sulphophenyl)-amino-triazine, 2,4-difluoro-6-(2'-chloro-4'-sulphophenyl)-amino-triazine, 2,4-difluoro-6-(2'-chloro-5'-sulphophenyl)-amino-triazine, 2,4-difluoro-6-(2'-methoxy-4'-sulphophenyl)-amino-triazine, 2,4-difluoro-6-(o-, m-, p-carboxyphenyl)-amino-triazine, 2,4-difluoro-6-(N-methylphenyl)-amino-triazine, 2,4-difluoro-6-(N-ethylphenyl)-amino-triazine, 2,4-difluoro-6-(N-isopropylphenyl)-amino-triazine, 2,4-difluoro-6- cyclohexylamino-triazine, 2,4-difluoro-6-morpholino-triazine, 2,4-difluoro-6-piperidino-triazine, 2,4-difluoro-6-benzylamino-triazine, 2,4-difluoro-6-N-methyl-benzylamino-triazine, 2,4-difluoro-6-β-phenylethyl-amino-triazine, 2,4-difluoro-6-(X-sulpho-benzyl)-amino-triazine, 2,4-difluoro-6-(2',4'-disulphophenyl)-amino-triazine, 2,4-difluoro-6-(3',5'-disulphophenyl)-amino-triazine, 2,4-difluoro-6-(2'-carboxy-4'-sulpho-phenyl)-amino-triazine, 2,4-difluoro-6-(2',5'-disulpho-4-methoxyphenyl)amino-triazine, 2,4-difluoro-(2'-methyl-4',6'-disulphophenyl)-amino-triazine, 2,4-difluoro-(6',8'-disulphonaphth-2'-yl)-amino-triazine, 2,4-difluoro-(4',8'-disulphonaphth-2'-yl)-amino-triazine, 2,4-difluoro-(4',6',8'-trisulphonaphth-2'-yl)-amino-triazine, 2,4-difluoro-(3',6',8'-trisulphonaphth-2'-yl)-amino-triazine, 2,4-difluoro-(3',6'-disulphonaphth-1'-yl)-amino-triazine, 2,4-difluoro-6-amino-triazine, 2,4-difluoro-6-methylamino-triazine, 2,4-difluoro-6-ethylamino-triazine, 2,4-difluoro-6-methoxyethoxy-triazine, 2,4-difluoro-6-methoxy-ethylamino-triazine, 2,4-difluoro-6-dimethylamino-triazine, 2,4-difluoro-6-diethylaminotriazine, 2,4-difluoro-6-isopropylaminotriazine, tetrahalogenopyrimidines, such as tetrachloro-, tetrabromo- or tetrafluoro-pyrimidine, 2,4,6-trihalogenopyrimidines, such as 2,4,6-trichloro-, tribromo- or trifluoro-pyrimidine, dihalogenopyrimidines, such as 2,4-dichloro-, -dibromo- or -difluoropyrimidine; 2,4,6-trichloro-5-nitro- or -5-methyl- or -5-carbomethoxy- or -5-carboethoxy- or -5-carboxymethyl- or -5-mono-, -di- or -trichloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoro-5-ethylsulphonylpyrimidine, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or -dibromopyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, alkyl 2,4,6-trifluoropyrimidine-5-carboxylates or -5-carboxamides, 2,6-difluoro-5-methyl-4-chloropyrimidine, 2,6-difluoro-5-chloropyrimidine, 2,4,6-trifluoro-5-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoropyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethylpyrimidine, 2,4-difluoro-5-methylsulphonylpyrimidine, 2,4-difluoro-5-phenyl-pyrimidine, 2,4-difluoro-5-carboxamido-pyrimidine, 2,4-difluoro-5-carbomethoxy-pyrimidine, 2,4-difluoro-6-trifluoromethylpyrimidine, 2,4-difluoro-6-carboxamido-pyrimidine, 2,4-difluoro-6-carbomethoxypyrimidine, 2,4-difluoro-6-phenyl-pyrimidine, 2,4-difluoro-6-cyanopyrimidine, 2,4,6-trifluoro-5-methylsulphonylpyrimidine, 2,4-difluoro-5-sulphonamidopyrimidine, 2,4-difluoro-5-chloro-6-carbomethoxy-pyrimidine and 5-trifluoromethyl-2,4-difluoropyrimidine.

e) 2,4,6-Trifluoro-S-Triazine of the Formula (20)

f) Compounds of the Formula (21)

Methanol, methylmercaptan, thiophenol, phenol, p-nitrophenol, phenol-4-sulphonic acid, ammonia, methylamine, dimethylamine, ethylamine, diethylamine, propylamine, isopropylamine, butylamine, dibutylamine, isobutylamine, sec.-butylamine, hexylamine, methoxyethylamine, ethoxyethylamine, methoxypropylamine, chloroethylamine, hydroxyethylamine, dihydroethylamine, hydroxypropylamine, aminoethanesulphonic acid, β-sulphatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitroaniline, 2-nitro-4-methylaniline, 3-nitro-4-methylaniline, o-, m- and p-anisidine, o-, m- and p-phenetidine, 2-methoxy-5-methylaniline, 2-ethoxy-5-methoxyaniline, 4-bromoaniline, 4-aminophenylsulphamide, 3-trifluoromethylaniline, 3- and 4-aminophenylurea, 1-naphthylamine, 2-naphthylamine, 2-amino-1-hydroxy-naphthalene, 1-amino-4-hydroxynaphthalene, 1-amino-8-hydroxy-naphthalene, 1-amino-2-hydroxy-naphthalene, 1-amino-7-hydroxy-naphthalene, orthanilic acid, metanilic acid, sulphanilic acid, aniline-2,4-disulphonic acid, aniline-2,5-disulphonic acid, aniline-3,5-disulphonic acid, anthranilic acid, m- and p-aminobenzoic acid, 4-aminophenylmethanesulphonic acid, aniline-N-methanesulphonic acid, 2-aminotoluene-4-sulphonic acid, 2-aminotoluene-5-sulphonic acid, p-aminosalicylic acid, 1-amino-4-carboxybenzene-3-sulphonic acid, 1-amino-2-carboxy-benzene-5-sulphonic acid, 1-amino-5-carboxybenzene-2-sulphonic acid, 1-naphthylamine-2-, -3-, -4-, -5-, -6-, -7- and -8-sulphonic acid, 2-naphthylamine-1-, -3-, -4-, -5-, -6-, -7- and -8-sulphonic acid, 1-naphthylamine-2,4-, -2,5-, -2,7-, -2,8-, -3,5-, -3,6-, -3,7-, -3,8-, -4,6-, -4,7-, -4,8- and -5,8-disulphonic acid, 2-naphthylamine-1,5-, -1,6-, -1,7-, -3,6-, -3,7-, -4,7-, -4,8-, -5,7- and -6,8-disulphonic acid, 1-naphthylamine-2,4,6-, -2,4,7-, -2,5,7-, -3,5,7-, -3,6,8- and -4,6,8-trisulphonic acid, 2-naphthylamine-1,3,7-, -1,5,7-, -3,5,7-, -3,6,7-, -3,6,8- and -4,6,8-trisulphonic acid, 2-, 3- and 4-aminopyridine, 2-aminobenzthiazole, 5-, 6- and 8-aminoquinoline, 2-aminopyrimidine, morpholine, piperidine and piperazine.

N-β-Hydroxyethylaniline, semicarbazide, benzoic acid hydrazide, 4-(β-sulphatoethylsulphonyl)-aniline, 3-(β-sulphatoethylsulphonyl)-aniline, 4-amino-1-methoxy-benzene-2-sulphonic acid, 4-amino-1-ethoxy-benzene-2-sulphonic acid, 4-aminophenol-6-sulphonic acid, 2-aminophenol-5-sulphonic acid, 4-aminotoluene-2-sulphonic acid, β-N-methylaminopropionitrile, β-aminopropionitrile and aminoacetic acid.

The reactive dyestuffs of the formula (1) can be isolated, and processed to give useful, dry dye preparations. The isolation is preferably effected at as low a temperature as possible, by salting out and filtration. The filtered dyestuffs can be dried, if appropriate after the addition of extenders and/or buffers, for example after the addition of a mixture of equal parts of mono- and disodium phosphate; the drying is preferably carried out at temperatures which are not too high and under reduced pressure. In certain cases, the dry preparations according to the invention can be prepared directly, that is to say without intermediate isolation of the dyestuffs, by spray-drying the total preparation mixture.

The reactive dyestuffs of the formula (1) are distinguished by high reactivity, and give dyeings with good fastnesses to wet treatment and to light. Features to be particularly singled out are that the dyestuffs have good solubility and electrolyte solubility coupled with good exhaustion properties and a high degree of dyestuff fixation, and that the parts which are not fixed can be readily removed. The dyeings are dischargeable.

The reactive dyestuffs of the formula (1) are suitable for dyeing and printing the most diverse substrates, such as silk, leather, wool, superpolyamide fibres and superpolyamide-urethanes, but in particular cellulose-containing materials of fibrous structure, such as linen, pulp, regenerated cellulose and in particular cotton. They are suitable both for the exhaust method and for dyeing by the pad dyeing method in which the fabric is impregnated with aqueous, and if appropriate also salt-containing, dyestuff solutions, and the dyestuffs, after treatment with alkali or in the presence of alkali, are fixed, if appropriate under the action of heat.

They are also suitable for printing, in particular on cotton, but also for printing nitrogen-containing fibres, for example wool, silk or mixed fabrics containing wool.

It is advisable to subject the dyeings and the prints to thorough rinsing with cold and hot water, if appropriate with the addition of an agent which has a dispersive action and which promotes the diffusion of the parts which are not fixed. The formulae given are those of the free acids. The dyestuffs are employed in general in the form of their salts. Suitable salts are in particular the alkali metal salts (Li salts, Na salts and K salts) or ammonium salts.

EXAMPLE 1

87.4 g of the dyestuff of the formula

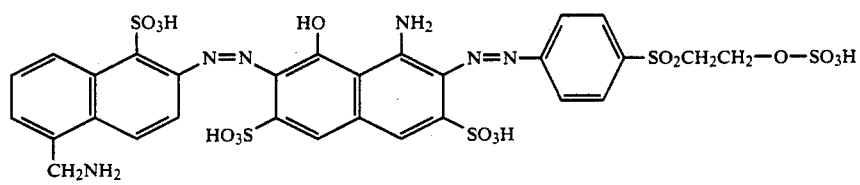

are stirred in 1,000 ml of water. The mixture is cooled to 12°–15° C. and 17 g of 2,4,6-trifluoro-5-chloropyrimidine are added dropwise in the course of half an hour, and the pH is kept between 8.0 and 8.5 by simultaneous addition of 10% strength sodium hydroxide solution. After condensation is complete, the dyestuff is salted out. A dark powder which is readily soluble in water to give a blue solution and which dyes cotton in dark blue (39) to black hues is obtained. The dyestuff corresponds to the formula

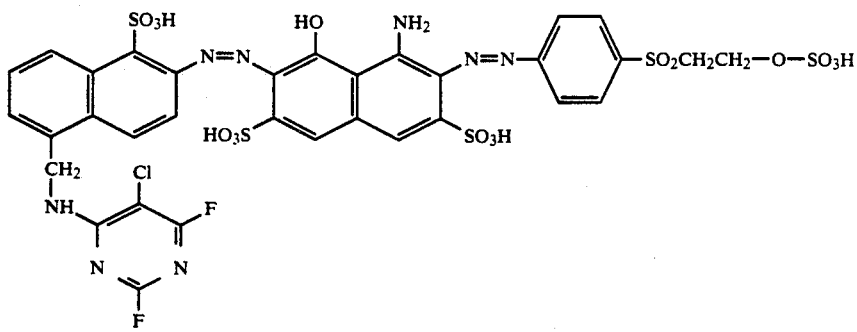

If, in Example 1, the 2,4,6-trifluoro-5-chloropyrimidine is replaced by the fluoro-heterocyclic compounds listed below, reactive dyestuffs which dye cotton in dark blue (39) to black hues (in brackets: Colour Index hue number) are likewise obtained.

TABLE 1

| | |
|---|---|
| A | 2,4,6-Trifluoro-5-chloro-pyrimidine |
| B | 2,4-Difluoro-5,6-dichloro-pyrimidine |
| C | 2,4-Difluoro-5-chloro-6-methyl-pyrimidine |
| D | 2,4-Difluoro-5-chloro-pyrimidine |
| E | 2,4-Difluoro-6-amino-triazine |
| F | 2,4-Difluoro-6-methylamino-triazine |
| G | 2,4-Difluoro-6-(o-sulphophenylamino)-triazine |

TABLE 1-continued

| | |
|---|---|
| H | 2,4-Difluoro-6-(m-sulphophenylamino)-triazine |
| J | 2,4-Difluoro-6-(p-sulphophenylamino)-triazine |
| K | 2,4-Difluoro-6-(2'-methyl-5'-sulphophenylamino)-triazine |

If, in Example 1, the disazo dyestuff is replaced by the disazo dyestuffs mentioned in column 2, the 2,4,6-trifluoro-5-chloropyrimidine is replaced by the fluoroheterocyclic compounds listed in column 3, and dyeing is otherwise carried out as indicated in Example 1, reactive dyestuffs which dye cotton in the hues listed in column 4 (in brackets: Colour Index hue number) are obtained.

TABLE 2

| Example | Disazo dyestuff | Fluoro-heterocyclic compound | Hue with Colour Index hue number |
|---|---|---|---|
| 1 | [structure] | A | dark blue (39) |
| 2 | [structure] | D | dark blue (39) |
| 3 | [structure] | E | dark blue (39) |
| 4 | [structure] | G | dark blue (39) |
| 5 | [structure] | A | dark blue (39) |
| 6 | [structure] | D | dark blue (39) |

TABLE 2-continued

| Example | Disazo dyestuff | Fluoro-heterocyclic compound | Hue with Colour Index hue number |
|---|---|---|---|
| 7 | CH$_3$—NH—CH$_2$—C$_6$H$_4$—N=N—(naphthalene: HO, NH$_2$, HO$_3$S, SO$_3$H)—N=N—C$_6$H$_4$—SO$_2$CH$_2$CH$_2$—O—SO$_3$H | E | dark blue (39) |
| 8 | CH$_3$—NH—CH$_2$—C$_6$H$_4$—N=N—(naphthalene: HO, NH$_2$, HO$_3$S, SO$_3$H)—N=N—C$_6$H$_4$—SO$_2$CH$_2$CH$_2$—O—SO$_3$H | G | dark blue (39) |
| 9 | (naphthalene with SO$_3$H, CH$_2$NH$_2$)—N=N—(naphthalene: HO, NH$_2$, HO$_3$S, SO$_3$H)—N=N—C$_6$H$_4$—SO$_2$CH$_2$CH$_2$—O—SO$_3$H | A | dark blue (39) |
| 10 | (naphthalene with SO$_3$H, CH$_2$NH$_2$)—N=N—(naphthalene: HO, NH$_2$, HO$_3$S, SO$_3$H)—N=N—C$_6$H$_4$—SO$_2$CH$_2$CH$_2$—O—SO$_3$H | B | dark blue (39) |
| 11 | (naphthalene with SO$_3$H, CH$_2$NH$_2$)—N=N—(naphthalene: HO, NH$_2$, HO$_3$S, SO$_3$H)—N=N—C$_6$H$_4$—SO$_2$CH$_2$CH$_2$—O—SO$_3$H | E | dark blue (39) |
| 12 | (naphthalene with SO$_3$H, CH$_2$NH$_2$)—N=N—(naphthalene: HO, NH$_2$, HO$_3$S, SO$_3$H)—N=N—C$_6$H$_4$—SO$_2$CH$_2$CH$_2$—O—SO$_3$H | K | dark blue (39) |
| 13 | (C$_6$H$_3$ with SO$_3$H, CH$_2$NHCH$_3$)—N=N—(naphthalene: HO, NH$_2$, SO$_3$H, SO$_3$H)—N=N—C$_6$H$_4$—SO$_2$CH$_2$CH$_2$—O—SO$_3$H | A | navy blue (28) |
| 14 | (C$_6$H$_3$ with SO$_3$H, CH$_2$NHCH$_3$)—N=N—(naphthalene: HO, NH$_2$, SO$_3$H, SO$_3$H)—N=N—C$_6$H$_4$—SO$_2$CH$_2$CH$_2$—O—SO$_3$H | B | navy blue (28) |
| 15 | (C$_6$H$_3$ with SO$_3$H, CH$_2$NHCH$_3$)—N=N—(naphthalene: HO, NH$_2$, SO$_3$H, SO$_3$H)—N=N—C$_6$H$_4$—SO$_2$CH$_2$CH$_2$—O—SO$_3$H | D | navy blue (28) |
| 16 | (C$_6$H$_3$ with SO$_3$H, CH$_2$NHCH$_3$)—N=N—(naphthalene: HO, NH$_2$, SO$_3$H, SO$_3$H)—N=N—C$_6$H$_4$—SO$_2$CH$_2$CH$_2$—O—SO$_3$H | E | navy blue (28) |
| 17 | CH$_3$O—C$_6$H$_2$(CH(CH$_3$)NH$_2$)(SO$_3$H)—N=N—(naphthalene: HO, NH$_2$, SO$_3$H, SO$_3$H)—N=N—C$_6$H$_4$—SO$_2$CH$_2$CH$_2$—O—SO$_3$H | A | greenish blue (40) |

TABLE 2-continued

| Example | Disazo dyestuff | Fluoro-heterocyclic compound | Hue with Colour Index hue number |
|---|---|---|---|
| 18 | ![structure] CH3O—⬡—N=N—[naphthalene with HO, NH2, SO3H, SO3H]—N=N—⬡—SO2CH2CH2—O—SO3H; with H3C, SO3H, NH2 substituents | B | greenish blue (40) |
| 19 | (same structure as 18) | C | greenish blue (40) |
| 20 | (same structure as 18) | D | greenish blue (40) |
| 21 | ![structure] naphthalene-SO3H, CH2NH2—N=N—[naphthalene with HO, NH2, HO3S, SO3H]—N=N—⬡—SO2CH=CH2 | A | dark blue (39) |
| 22 | ![structure] ⬡(SO3H, NH2)—N=N—[naphthalene with HO, NH2, HO3S, SO3H]—N=N—⬡—SO2CH=CH2 | A | navy blue (28) |

EXAMPLE 23

61.1 g of the dyestuff of the formula

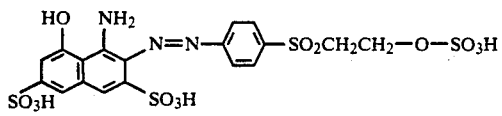

are coupled, at a pH 6–7, to the diazonium compound obtained from 33.7 g of the condensation product of 18.8 g of 1,3-diaminobenzene-6-sulphonic acid with 17 g of 2,4,6-trifluoro-5-chloro-pyrimidine, to give a dark blue dyestuff. After salting out, isolation, drying and milling, the dyestuff of the formula

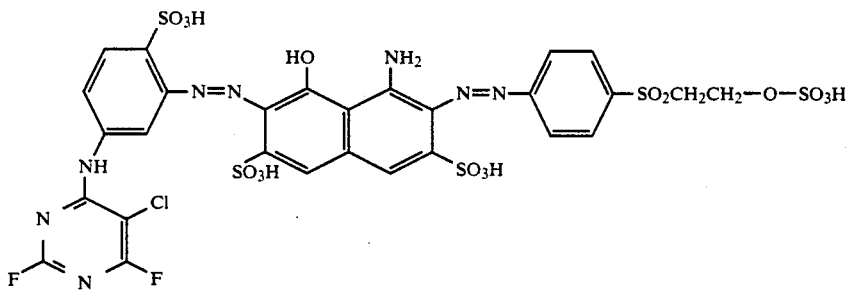

is obtained as a dark powder which dissolves in water to give a blue solution, and dyes cotton in navy blue (28) to black hues.

When the procedure described is followed and the condensation products obtainable from the diaminobenzenesulphonic acids mentioned in column 2 and the fluoroheterocyclic compounds listed in column 3 are used as a starting material for the diazonium compound, and the compounds described in column 4 are employed as monoazo dyestuffs which can be coupled at pH 6–7, reactive dyestuffs which dye cotton in the hues mentioned in column 5 (in brackets: Colour Index hue number) are likewise obtained.

TABLE 3

| Example | Diaminobenzenesulphonic acid | Fluoro-pyrimidine | Monoazo dyestuff | Hue with Colour Index hue number |
|---|---|---|---|---|
| 24 | 1,3-diaminobenzene-6-sulphonic acid | B | ![structure] HO, NH$_2$, SO$_3$H, SO$_3$H, N=N—C$_6$H$_4$—SO$_2$CH$_2$CH$_2$—O—SO$_3$H | navy blue (28) |
| 25 | 1,3-diaminobenzene-6-sulphonic acid | E | HO, NH$_2$, SO$_3$H, SO$_3$H, N=N—C$_6$H$_4$—SO$_2$CH$_2$CH$_2$—O—SO$_3$H | navy blue (28) |
| 26 | 1,3-diaminobenzene-6-sulphonic acid | G | HO, NH$_2$, SO$_3$H, SO$_3$H, N=N—C$_6$H$_4$—SO$_2$CH$_2$CH$_2$—O—SO$_3$H | navy blue (28) |
| 27 | 1,4-diaminobenzene-2-sulphonic acid | A | HO, NH$_2$, SO$_3$H, SO$_3$H, N=N—C$_6$H$_4$—SO$_2$CH$_2$CH$_2$—O—SO$_3$H | greenish blue (48) |
| 28 | 1,4-diaminobenzene-2-sulphonic acid | B | HO, NH$_2$, SO$_3$H, SO$_3$H, N=N—C$_6$H$_4$—SO$_2$CH$_2$CH$_2$—O—SO$_3$H | greenish blue (48) |
| 29 | 1,4-diaminobenzene-2-sulphonic acid | E | HO, NH$_2$, SO$_3$H, SO$_3$H, N=N—C$_6$H$_4$—SO$_2$CH$_2$CH$_2$—O—SO$_3$H | greenish blue (48) |
| 30 | 1,4-diaminobenzene-2-sulphonic acid | G | HO, NH$_2$, SO$_3$H, SO$_3$H, N=N—C$_6$H$_4$—SO$_2$CH$_2$CH$_2$—O—SO$_3$H | greenish blue (48) |
| 31 | 1,4-diaminobenzene-2,5-disulphonic acid | A | HO, NH$_2$, SO$_3$H, SO$_3$H, N=N—C$_6$H$_4$—SO$_2$CH$_2$CH$_2$—O—SO$_3$H | greenish blue (48) |
| 32 | 1,4-diaminobenzene-2,5-disulphonic acid | E | HO, NH$_2$, SO$_3$H, SO$_3$H, N=N—C$_6$H$_4$—SO$_2$CH$_2$CH$_2$—O—SO$_3$H | greenish blue (48) |
| 33 | 1,4-diaminobenzene-2,5-disulphonic acid | F | HO, NH$_2$, SO$_3$H, SO$_3$H, N=N—C$_6$H$_4$—SO$_2$CH$_2$CH$_2$—O—SO$_3$H | greenish blue (48) |
| 34 | 1,4-diaminobenzene-2,5-disulphonic acid | D | HO, NH$_2$, SO$_3$H, SO$_3$H, N=N—C$_6$H$_4$—SO$_2$CH$_2$CH$_2$—O—SO$_3$H | greenish blue (48) |

EXAMPLE 35

81 g of the dyestuff of the formula

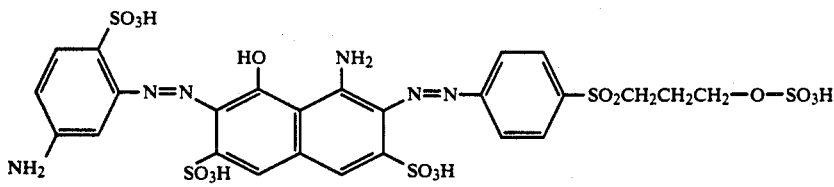

are dissolved in 1,000 ml of ice water. 13.5 g of trifluorotriazine are added dropwise, and the pH is kept between 6 and 6.5 by simultaneous addition of 15% strength sodium carbonate solution. A neutral solution of 17.3 g of m-sulphanilic acid is then added, and the pH is further kept between 6–6.5. After condensation is complete, the solution is spray-dried. A powder which is readily soluble in water to give a blue solution and which dyes cotton in navy blue (28) to black hues is obtained.

The dyestuff corresponds to the formula

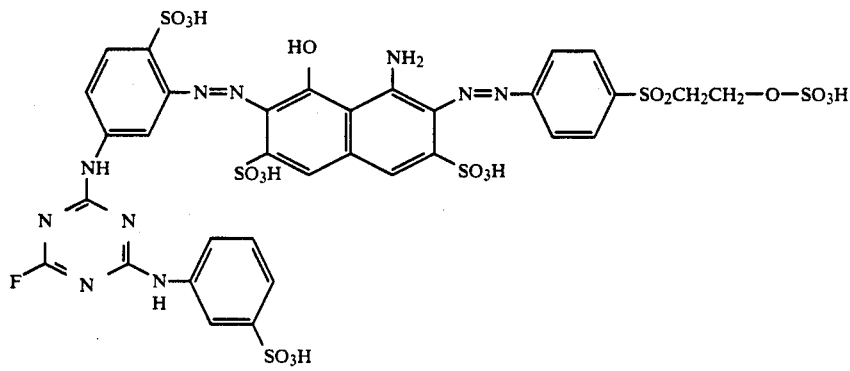

If, in this example, m-sulphanilic acid is replaced by the amines mentioned below, dyestuffs result which dye cotton in navy blue (28) to black hues.

Aniline, m-chloroaniline, p-chloroaniline, o-toluidine, p-toluidine, o-anisidine, p-anisidine, N-methylaniline, N-ethylaniline, 4-acetylaminoaniline, 3-acetylaminoaniline, 2-aminotoluene-4-sulphonic acid and p-sulphanilic acid.

If, in this example, 89 g of the dyestuff of the formula

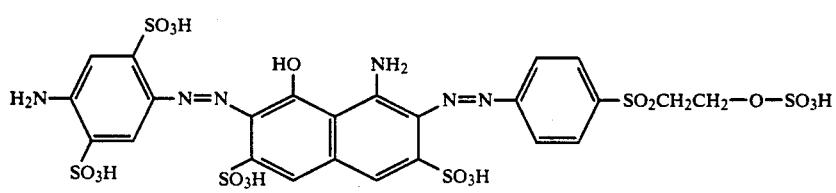

is used as the disazo dyestuff and the amines listed at the end of this example are employed, valuable reactive dyestuffs which dye cotton in greenish blue (40) to black hues are likewise obtained.

I claim:

1. A dyestuff of the formula

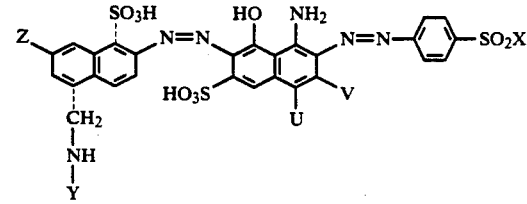

wherein

X is —CH=CH$_2$, —CH$_2$—CH$_2$OSO$_3$H, —CH=CHCl or —CH$_2$—CH$_2$Cl,

Y is a fiber-reactive fluoropyrimidinyl radical reactive with a hydroxy or nitrogen-containing fiber and one of u and v is H and the other is SO$_3$H, and Z is H or SO$_3$H.

2. A dyestuff of the formula

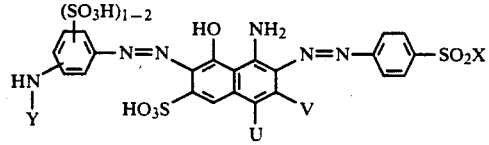

wherein

X is —CH=CH$_2$—CH$_2$—CH$_2$—CH$_2$OSO$_3$H, —CH=CHCl or —CH$_2$—CH$_2$Cl,

Y is

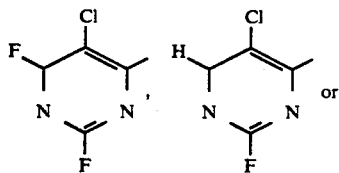 or 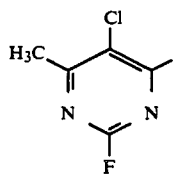
4. A dyestuff selected from the group consisting of
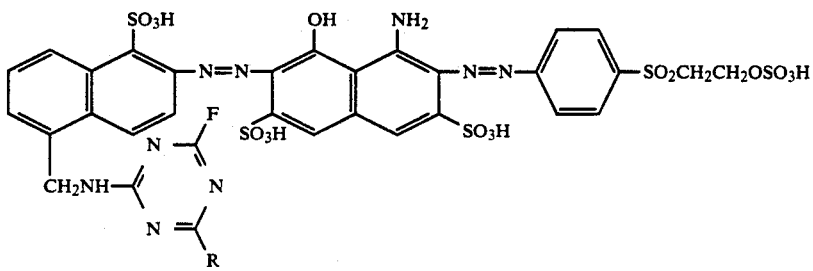
and
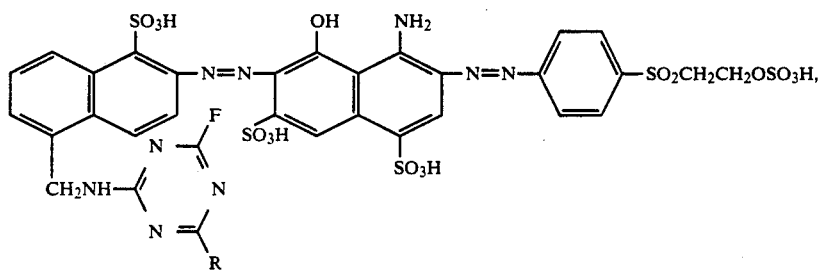
wherein
R is NH$_2$, 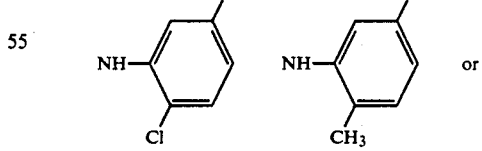
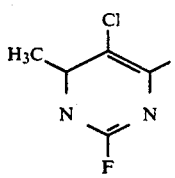
and one of u and v is H and the other is SO$_3$H.
3. A dyestuff according to claim 1, where Y is selected from the group consisting of
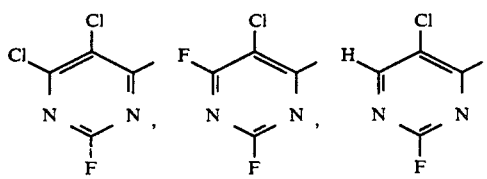
and
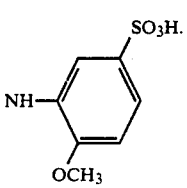
5. A dyestuff selected from the group consisting of

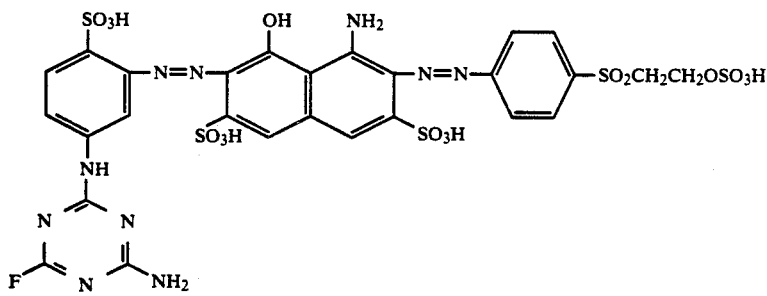
and
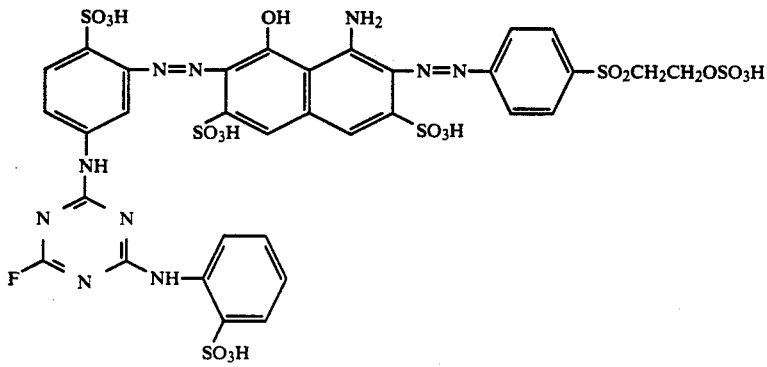
6. A dyestuff selected from the group consisting of
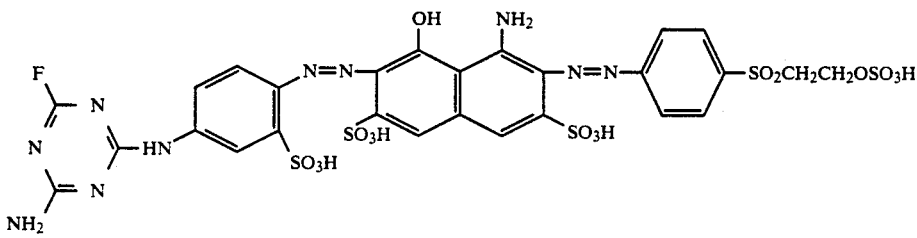
and
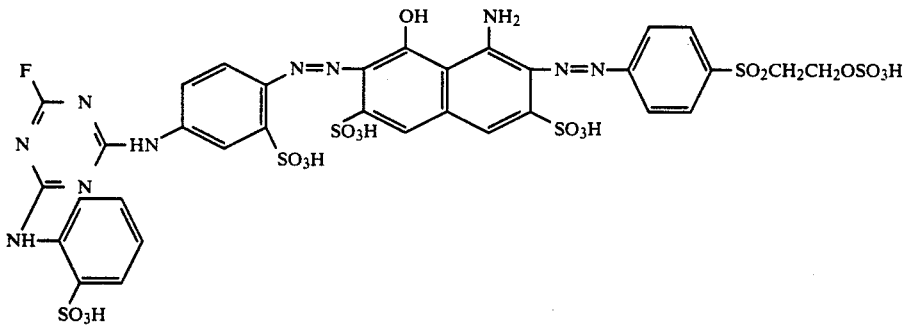
7. A dyestuff selected from the group consisting of
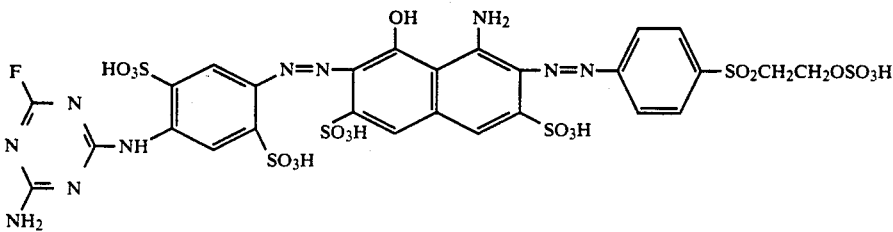

and
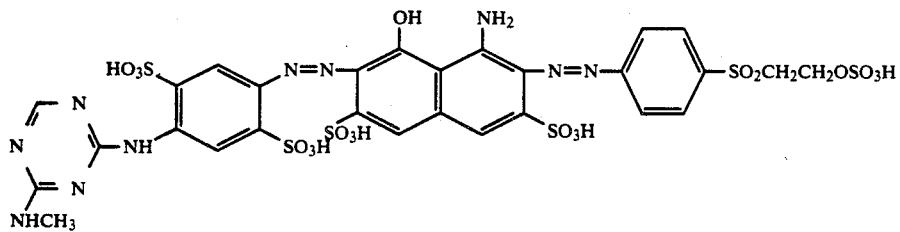
* * * * *

UNITED STATES PATENT AND TRADEMARK OFFICE
CERTIFICATE OF CORRECTION

PATENT NO. : 5,241,057
DATED     : August 31, 1993
INVENTOR(S) : Horst Jager

It is certified that error appears in the above-identified patent and that said Letters Patent is hereby corrected as shown below:

Col. 20, line 66    Delete " $-CH=CH_2-CH_2-CH_2-CH_2OSO_3H$, and after " $CH=CH_2$ " insert -- ,$-CH_2-CH_2-CH_2OSO_3H$, --

Col. 25, line 8     Delete " 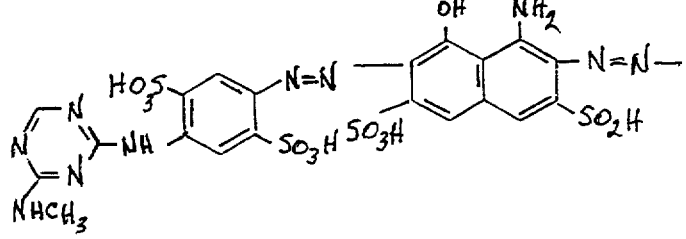

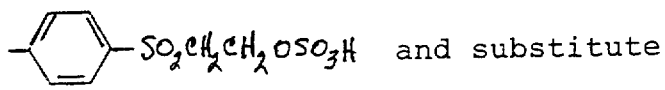  and substitute

UNITED STATES PATENT AND TRADEMARK OFFICE
CERTIFICATE OF CORRECTION

PATENT NO. : 5,241,057

DATED : August 31, 1993

INVENTOR(S) : Horst Jager

Page 2 of 2

It is certified that error appears in the above-indentified patent and that said Letters Patent is hereby corrected as shown below:

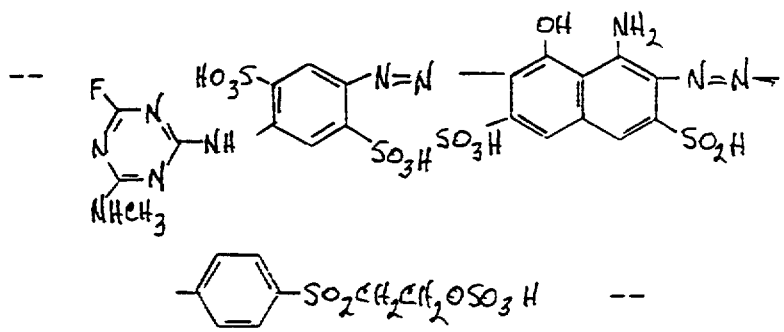

Signed and Sealed this

Twenty-third Day of August, 1994

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,241,057
DATED : August 31, 1993
INVENTOR(S) : Horst Jager

It is certified that error appears in the above-identified patent and that said Letters Patent is hereby corrected as shown below:

Column 20,
Lines 66 and 67, please delete and replace with
-- X is $-CH=CH_2$, $-CH_2-CH_2OSO_3H$, $-CH=CHCl$ or $-CH_2-CH_2Cl$ --.

Signed and Sealed this

Fifth Day of March, 2002

*Attest:*

JAMES E. ROGAN
*Attesting Officer*     *Director of the United States Patent and Trademark Office*